United States Patent [19]
Davies et al.

[11] 4,057,493
[45] Nov. 8, 1977

[54] DROPLET CONTROL ELEMENTS

[76] Inventors: Graham Arthur Davies, 19 Downesway, Alderley Edge, Cheshire; Godfrey Vaughan Jeffreys, 8 Heaton Drive, Four Oaks Park, Sutton Coldfield, Warwickshire; David Pryce Bayley, Clements House, Station Approach, South Croydon, Surrey, all of England

[21] Appl. No.: 665,076

[22] Filed: Mar. 8, 1976

Related U.S. Application Data

[63] Continuation of Ser. No. 327,838, Jan. 30, 1973, abandoned.

[51] Int. Cl.² .............................................. B01D 17/04
[52] U.S. Cl. .................................. 210/23 R; 210/83; 210/DIG. 5
[58] Field of Search .................. 161/58, 59, 65, 78, 161/79, 89, 91, 93, 113, 162, 196, 214, 216; 210/23, 83, 502–509, DIG. 5; 55/DIG. 16

[56] References Cited

U.S. PATENT DOCUMENTS

| | | | |
|---|---|---|---|
| 3,018,845 | 1/1962 | Powers | 210/505 |
| 3,087,699 | 4/1963 | Foster | 161/91 |
| 3,132,099 | 5/1964 | Eilhauer | 210/507 |
| 3,800,945 | 4/1974 | Fowler | 210/83 X |
| 3,876,544 | 4/1975 | Fowler | 210/DIG. 5 |
| 3,980,565 | 9/1976 | Fowler | 210/DIG. 5 |

Primary Examiner—John Adee
Attorney, Agent, or Firm—Stevens, Davis, Miller & Mosher

[57] ABSTRACT

A droplet coalescence control element having materials of different surface energy levels. The control element can take the form of a composite surface exhibiting elemental areas of the material or of a perforate packing with such said junctions exposed in its interstitial passages.

10 Claims, 13 Drawing Figures

DROPLET CONTROL ELEMENTS

This is a continuation of application Ser. No. 327,838 filed Jan. 30, 1973, now abandoned.

BACKGROUND OF THE INVENTION

This invention concerns droplet coalescence control elements, and relates to the phenomenon whereby when droplets come into contact with an impervious material surface which is wettable by the liquid of the droplets, each droplet tends to spread on that surface as a film so that coalescence of adjacent droplets will occur. It is here assumed that the natures of the material surface and liquid are such that they are not compatible in the sense of being chemically or otherwise mutually reactive.

Among the factors which determine the degree of wettability of a material surface by a liquid is the surface energy level of the material which requires to be high for some liquids and low for others.

It can be shown that if droplets of the dispersed phase of a liquid dispersion are directed at a perforated plate which is non-wetted by the liquid of the dispersed phase and the ratio of hole size to droplet size is less than 0.4/1, then generally droplets will not pass through the holes and there will be a build-up of the dispersed phase on the up-stream side of the plate. However, if the dispersed phase liquid wets the plate surface, then the droplets form on the plate a film which can flow through the perforations and collect and coalesce on the downstream face of the plate to become detached therefrom either as large drops or by streaming in dependence upon the volumetric flow; the plate thus acts as a droplet coalescence control element.

The significance of the surface energy level of the surface material of the control element can be demonstrated as follows. If in the above mentioned arrangement the dispersed phase is water in a kerosene/water dispersion and the surface material of the perforated plate has a high surface energy level, e.g. stainless steel, there will be effective coalescence of the dispersed aqueous phase, but if the surface material has low surface energy level, e.g. polypropylene, coalescence of the dispersed aqueous phase will not occur and it will build up on the upstream side of the plate, i.e. flooding will occur. Conversely, if the kerosene is the dispersed phase, the surface material of the plate must have a low surface energy level for coalescence to occur.

Droplet coalescence control elements are applicable in many forms for a variety of purposes. In a fluid contacting process a liquid can be caused to travel in one direction, for instance downwards in a column, as a vapour moves in the opposite direction, and appropriately formed coalescence control elements are provided in the flow path to establish large exposed surfaces of fluid whereby to aid enrichment of the vapour by the liquid. In a de-entrainment operation for removing droplets of liquid from a vapour, the droplet laden vapour is caused to flow in a path containing coalescence control elements which will be selectively wetted by and thus serve to trap the droplets, whereby the droplets will be removed from the vapour. In a de-entrainment operation for removing liquid droplets from another immiscible or partly miscible liquid, the fluid to be treated is caused to flow in a path including appropriate droplet coalescence control elements whereby the droplets are coalesced and removed. Also, in the separation of liquid/liquid dispersion by the use of a settling tank, which may be part of an operation for separating a liquid/liquid mixture by solvent extraction, there may be used droplet coalescence control elements, usually in the form of packings as hereinafter defined, to affect the dispersed phase in the sense to accelerate separation. Where reference is made to fluid being caused to flow in a path, the direction of the path may or may not be determined by the nature of the fluid; it may necessarily be vertical in some cases or horizontal in others, or in some instances it may conveniently be either.

Typical circumstances in which droplet coalescence control elements may be used are distillation columns, rectification columns, absorption towers, liquid extraction equipment, and liquid separators, particularly settlers for separating the phases of dispersions. The physical forms of the elements will be determined by the particular nature of the operations to be performed. For instance, the elements may be in the nature of baffles so that coalescence occurs on a substantially flat surface, which may or not be perforated. In some cases the elements may be serving as, or as parts of, condensers for vapours, in which case the liquid collects by coalescence and is removed in any convenient manner from a baffle surface, ordinarily a cooled surface. For many purposes, for instance filtration and separation processes, it is convenient to use a droplet coalescence control element in the form of a perforate packing, that is a body exhibiting a labyrinth formation of intersticial passages extending between an entry face and an exit face of the body. Such a perforate packing may be built up of tubular, ringlike, saddle shaped and/or platelike units, but more conveniently it can be formed of woven fabric or knitted mesh fabric, in the latter case being, for example, of the kind known in Great Britain as "knitmesh D.C." packing.

In previous proposals the surface of a droplet coalescence control element has consisted of a single material, that is a material having a uniform surface energy level which is selected according to the nature of the liquid to be controlled by it. The performance of such droplet coalescence control elements, in relation to liquid extraction and phase separation, has been explained by G. A. Davies and G. V. Jeffreys in "Filtration and Separation", Volume 6, No. 4, pages 349–354.

However there have sometimes been experienced difficulties in obtaining a control surface which is desirably compatible with a component fluid being processed.

SUMMARY OF THE INVENTION

It is an object of this invention to provide a droplet coalescence control element, for use for instance in any of the circumstances above mentioned, which will lead to improved performance of apparatus of which it is part.

We have discovered that coalescence of the droplets comprising a dispersed phase is enhanced at the junction between impervious surfaces of a high surface energy level material and a low surface energy level material, of which one surface is wettable and the other surface is non-wettable by the dispersed phase.

In accordance with the invention, a droplet coalescence control element presents an array of exposed junctions between surfaces of different surface energy level materials.

Usually the element will present an array of junctions between surfaces of only two different surface energy level materials. However it is within the ambit of this invention to provide an array of junctions between surfaces of more than two different surface energy level materials, for example, three materials of surface energy levels A, B, C, to present an array of junctions A/B, A/C, B/C.

In one form of the invention, a droplet coalescence control element has a composite surface comprising elemental areas of the different surface energy level materials. This arrangement may comprise a surface of a first surface energy level material interrupted by elemental areas of a second surface energy level material. For instance, in one arrangement the elemental areas of the second surface energy level material may be depositions on the first surface energy level material, as for example obtained by spraying, painting or printing. In another arrangement the elemental areas of the second surface energy level material may have been formed by local removal, as for example by scratching or etching, of parts of a covering of the second surface energy level material on a surface of the first surface energy level material. In yet another arrangement, the second surface energy level material may be a mesh or other perforated layer adherent to a continuous surface of the first energy level material.

In another form of the invention, a droplet coalescence control element is a woven, knitted or other mesh fabric of which the threads, fibres, filaments or other components are composed of at least two materials having surfaces of different surface energy levels.

In accordance with another aspect of the invention there is provided a perforate packing, as herein-before defined, in which the junctions between the surfaces of different surface energy levels are exposed at the inlet and exit faces and within the intersticial passages.

The perforate packing may comprise a mass of first elemental units each having a surface of one surface energy level interspersed with second elemental units each having a surface of another surface energy level. Alternatively the perforate packing may comprise a mass of elemental units each of which is a droplet coalescence control element presenting an array of exposed junctions between surfaces of different surface energy level materials.

Preferably a perforate packing will comprise several layers of woven, knitted or other fabric of which the component threads, fibres, filaments or other members are composed of at least two materials having surfaces of different surface energy levels.

Where the improved droplet coalescence control element is one or more layers of woven or knitted fabric, the, or at least some of the, threads or filaments which are knitted or woven together may be at least two-ply of which the plies are of the different surface energy level materials. Conversely, in a knitted or woven fabric, of the threads or filaments which are knitted or woven together at least one, which may be a single element or at least two-ply, is formed entirely of a single surface energy level material.

BRIEF DESCRIPTION OF THE DRAWINGS:

Some droplet coalescence control elements embodying the invention are described hereinafter, by way of examples, with reference to the accompanying diagrammatic drawings, wherein.

DESCRIPTION OF THE PREFERRED EMBODIMENTS

Figure 1:
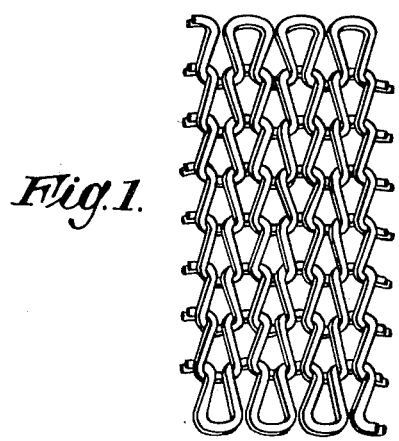
FIG. 1 represents a form of knitted mesh to be used as a component of a perforate packing.

Some examples of the composition and use of the improved droplet coalescence control elements are described hereinafter with some reference, by way of explanation, to known practice.

For the phase separation of a kerosene/water dispersion there can be used a droplet coalescence control element in the form of a knitted mesh packing, for instance a KnitMesh D.C. packing. If the water is the dispersed phase the packing can be formed of stainless steel wire which has the desired high surface energy level and is not reactive with either the water or the kerosene. Alternatively if the kerosene is the dispersed phase the packing can be formed of filaments of polypropylene as having the desired low surface energy level and also being non-reactive with either the water or the kerosene. The phase separation can be effected by causing the dispersion to flow through the packing into a separation vessel. Whichever is the dispersed phase, and provided that the material of the packing has the appropriate surface energy level, the action is as follows. The dispersed phase wets the component wires or filaments so that the droplets coalesce thereon into liquid films which assist the flow through the intersticial passages to the exit face of the packing, to leave that face as bigger drops or as substantially continuous streams or jets or as a mixture of both. In any particular circumstances there is a maximum flow rate through the packing above which flooding, as above described, will occur.

If however there is used a packing of similar physical structure but formed, in accordance with this invention, of a mixture of stainless steel wires and polypropylene filaments, so that there is distributed throughout the packing a multitude of junctions between the high and low surface energy level materials, being the places of contact between the wires and filaments, two marked advantages are obtained. First, the droplet coalescence effect occurs whether water or kerosene is the dispersed phase. Second, the maximum capacity, indicated by the flooding velocity, is considerably increased.

The results of experiments with a kerosene/water dispersion caused to flow through KnitMesh D.C. No. 9029 packings made up of a mesh knitted in one case only of 0.0048 inch diameter stainless steel wire, in another case only of 0.005 inch diameter polypropylene filament, and in a third case, a mixed structure, of the stainless steel wire and polypropylene filament knitted together. Stainless steel alone was substantially ineffective upon dispersed kerosene but effective on dispersed water, and that polypropylene alone was substantially ineffective on dispersed water but effective on dispersed kerosene, whereas the mixed structure of stainless steel and polypropylene was not only equally effective whichever was the dispersed phase but also had a maximum capacity, indicated by the flooding velocity, exceeding either of the uniform packing structures.

It is characteristic of KnitMesh D.C. packings that at least four junction points per stitch are achieved, so that by simply replacing one or more of the wires or non-metallic filaments, in a structure originally designed to be made of only one material, by one or more of the non-metallic filaments or wires there is obtainable a very effective form of the improved droplet coalescence control element. The knitted structure is not necessarily of single wires and filaments knitted together; the members so knitted together may be two- or multi-ply members, and, in changing from a uniform to a mixed structure, the material of a complete member or only one or more plies of the member may be changed.

Improved separation rates for Kerosene/water dispersions have also been obtained by using packings of a mixture of stainless steel and polytetrafluoroethylene (PTFE). With both stainless-steel/PTFE and stainless-steel/polypropylene mixtures, improved separation of water/kerosene dispersions has been obtained in a range of constituent ratios varying between 3 parts steel to 1 part polymer and 1 part steel to 3 parts polymer, but generally optimum results have been obtained with a 1:1 ratio of the materials.

The fact that the improved droplet coalescence control packing, that is the mixed packing, is substantially equally effective whichever is the dispersed phase is particularly advantageous in processes involving separation of the phases of a dispersion having a wide range of ambivalence, that is the range in which phase inversion may occur, because the occurrence of phase inversion will not substantially affect the operation.

The efficiency of a mixed packing, such as a Knitmesh packing, in such operations as distillation and absorption can be judged by the "Height Equivalent to a Theoretical Plate"(H.E.T.P.) value, the lower that value the better the performance and the more efficient the device. For instance an ethanol/water system, being an example of a system which forms an azeotrope, is a difficult system to separate. In order to compare the relative effects of single component and mixed packings, there were used packings of the same geometry but differing in composition, in that one was of stainless steel wire alone and the other a mixture of stainless steel wire and polypropylene filament. The results illustrate that the mixed packings give substantially reduced H.E.T.P. values, thus demonstrating the greatly improved efficiency and increased capacity brought about by the high-energy-surface/low-energy-surface junction effect.

Examples of materials presenting high surface energy levels are metals, metal oxides and salts, glass(including fibre glass), and ceramics. Materials presenting low surface energy levels are solid organic polymeric materials, namely solid organic polymeric materials sometimes referred to as plastics and synthetic or naturally occurring resinous polymers and co-polymers. Typical examples are polypropylene, nylon, polytetrafluoroethylene and polyethylene. The selection of the combinations of the materials any one purpose is largely dependent upon the nature of the fluids to be operated upon, for instance to avoid corrosion of a metal and swelling, softening or other degradation of a polymer. Mesh packing can be made of any appropriate materials which are suitable for making as wires or filaments for weaving or knitting. The mixed mesh packings are particularly suitable and advantageous for operating upon a wide range of aqueous/organic dispersions.

Where a droplet coalescence control element exhibiting the junction effect is required in the form of a flat or curved active surface having an array of junctions between surfaces of high and low surface energy materials, the active surface can be produced by any one of a variety of methods. For instance, the element may be formed of, or with a uniform surface formed of, a first material having one surface energy level on which is deposited, as by spraying, painting, printing or any other convenient method, discrete surface areas or particles of a second material having an appropriate other surface energy level. It would be within the scope of this invention to apply the second material as a perforated layer adherent to the underlying first material, as for instance causing a perforated layer of a polymeric material to adhere directly to an underlying metallic layer, or a perforated layer of metal to adhere directly to, perhaps as by being partially embedded in, an underlying polymeric layer. By another method, the second material may be formed as a uniform layer on the uniform underlayer of the first material and thereafter the upper layer being locally removed as by etching, scratching, scoring or otherwise to expose the underlayer. Where such a uniform upper layer is so removed mechanically, e.g. by scoring, it is to be noted that it may not be disadvantageous if some of scoring proceeds into the underlayer, because it is junctions between the materials which are required to be exposed and such junctions will be exposed even if the scoring is slightly deeper than the thickness of the outer layer.

Figure 2:
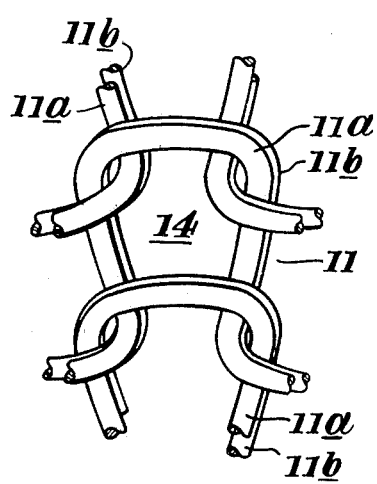
FIG. 2 is an enlargement of a small portion of FIG. 1.
Figure 3:
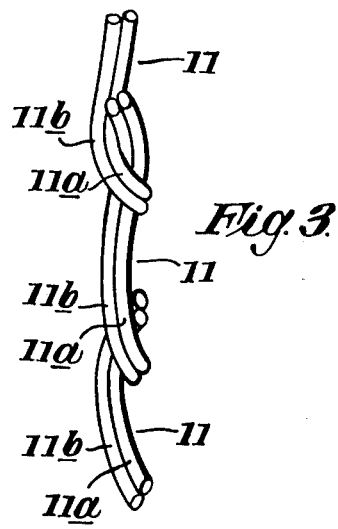
FIG. 3 is a side view of the arrangement shown in FIG. 2.
Figure 4:
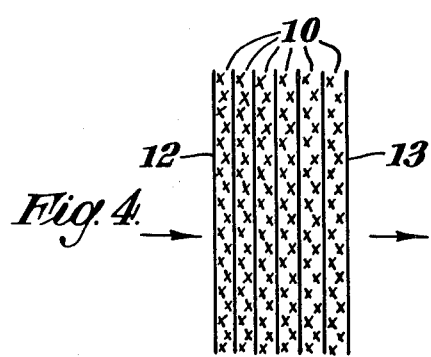
FIG. 4 represents a section of part of a perforate packing comprising several layers of the knitted mesh.

The perforate packing represented by FIG. 4 is a laminated pack of six layers 10 of knitted mesh, such as represented in FIGS. 1 to 3, knitted from a double strand 11 comprising a polypropylene filament 11a and a stainless steel wire 11b. In each layer 10, throughout the length of a double strand 11, wherever its component filament 11a and wire 11b are in contact there is a junction between the high surface energy stainless steel and the lower surface energy polypropylene. Also within each layer 10 there are further junctions of that nature where each loop of the mesh engages and crosses adjacent loops; for instance, in FIG. 2 the loop 14 shares eight crossing positions with adjacent loops. Moreover further junctions occur in a pack, as in FIG. 4, where adjacent layers 10 are in engagement. In the pack the knitted layers 10 co-operate to provide an intersticial structure of passages extending from an inlet face 12 to an outlet face 13 so that a dispersion can be caused to flow therethrough in the direction of the arrows. During its movement through the pack the dispersion will come into contact with the array of junctions so that, as previously described, the droplets comprising the dispersed phase will coalesce and the component liquids of the dispersion will separate from one another as they emerge from the outlet face 13.

Figure 5:
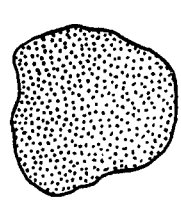
FIG. 5 represents part of a plate-like element of which the surface has droplet coalescence controlling properties.
Figure 6:
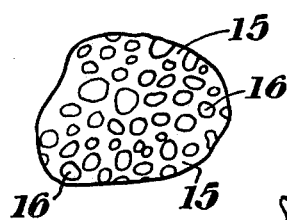
FIG. 6 is an enlargement of a small portion of FIG. 5.
Figure 7:
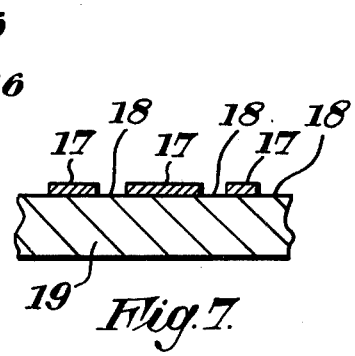
FIGS. 7 and 8 are sectional views, on much greater scale, illustrating two forms of the arrangement illustrated in FIGS. 5, and 6.
Figure 8:
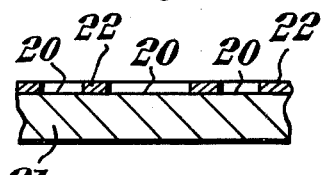

Referring now to FIGS. 5 and 6, a plate-like element has a main surface 15 of a material of one surface energy level interrupted by many small separate areas 16 of material of another surface energy level. The separate areas 16 may be sprayed or otherwise deposited on the main surface 15, or the separate areas 16 may be exposed by etching or otherwise locally removing parts of a continuous covering which has first been applied to an underlayer. In FIG. 7 separate small areas 17 of one material have been deposited on the surface 18 of another material 19 so that the required junctions are formed at the boundaries of the separate small areas 17. In FIG. 8, on the surface 20 of a first material 21 was first applied a continuous layer of a second material 22, and the second material 22 has been selectively removed in a convenient manner to expose isolated small areas of the surface 20 of the first material, the required junctions being at the boundaries of those small areas.

Figure 9:
FIGS. 9 and 10 represent two other plate-like elements exhibiting droplet coalescence controlling properties.
Figure 10:
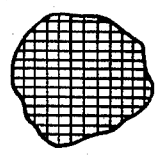
Figure 11:
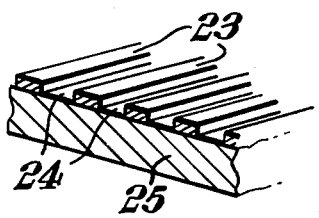
FIG. 11 is a part sectional view, to a greater scale, illustrating one form of the arrangement shown in FIG. 9.
Figure 12:
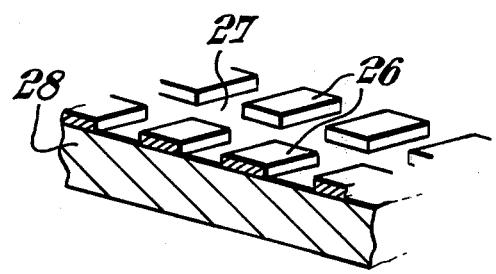
FIG. 12 is a part sectional view, also to a larger scale, illustrating a form of the arrangement shown in FIG. 10.

In FIG. 9 a plate-like member has a droplet coalescence control face comprising a close array of narrow strips of a first material alternating with narrow strips of the surface of another material, so that the required junctions occur at the boundaries of the strips. In FIG. 10 a second array of narrow strips of the first material extends at right angles to said close array to form a grid-like pattern. The arrangements shown in FIGS. 9 and 10 can be formed by any one of variety of methods. For instance the array or arrays of the first material can be directly applied to the second material, or may be formed by locally removing parts of a continuous layer of the first material by etching, scratching or otherwise. Referring to FIG. 11, strips 23 of the first material alternate with strips of the surface 24 of a second material 25. In FIG. 12, isolated areas 26 of a first material are defined by a grid-like pattern of channels exposing the surface 27 of a second material 28.

The arrangement shown in FIG. 10 can be provided by a grid-like mesh of a first material applied to the otherwise uninterrupted surface of a second material.

Figure 13:
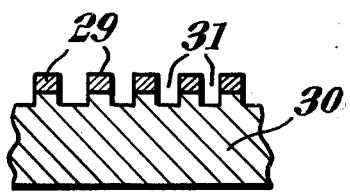
FIG. 13 is a section view illustrating another form of the arrangement shown in FIG. 9.

It is significant that if the arrangements represented by FIGS. 9 and 10 are obtained by scratching or otherwise locally removing a first material applied as a continuous layer on a continuous surface of a second material, although it is essential that the pattern obtained by such local removal shall extend completely through the thickness of the first material, it is of no disadvantage if the pattern extends into the layer of the second material, because it is the junction between the two materials which are required to be exposed. For example, referring to FIG. 13, a first material 29 has been applied as a continuous layer on a second material 30 and the first material 29 has then been locally removed to form in the first material 29 gaps 31 which actually extend partly into the second material 30. If the depth of the gaps 31 had been precisely the thickness of the first material 29, the surface of the second material 30 would have been exposed to form only the inner-most surfaces of the gaps 31 and the required junctions would be the boundary edges at the junctions of the sides and inner-most surfaces of the gaps. By the deepening of the gaps 31, as shown, the only difference is that the junctions occur actually in the side walls of the gaps.

It will be understood that the above description of the present invention is susceptible to various modification changes and adaptations.

What is claimed is:

1. A method of treating a liquid-liquid dispersion comprising droplets of a first liquid phase dispersed in a second liquid phase so as to promote coalescence of said droplets of said first liquid phase, which method comprises:

flowing said dispersion through a perforate packing comprising a coalescer body having an entry face, an exit face and a labyrinth of interstitial passages for said dispersion extending between said entry and exit faces, said body comprising high and low surface energy materials formed into threads, fibers or filaments, said high surface energy material being a metal, metal oxide, metal salt, glass or ceramic, and said low surface energy material being a solid organic polymeric material, said first liquid phase wetting one of said materials but not the other and said second liquid phase wetting said other material but not the said one material, said high and low surface energy materials meeting one another throughout said body at a plurality of surface junctions to provide enhanced droplet coalescence properties for said droplets of said first liquid phase, and said surface junctions occurring at said entry and exit faces and being substantially uniformly dispersed throughout said interstitial passages of said body exposed to said dispersion, whereby said body presents to said dispersion an array of surface junctions disposed along the path of flow of said dispersion at which said droplets coalesce, and removing coalesced droplets of said first liquid phase from the exit face of said coalescer body.

2. A method according to claim 1, in which said high and low surface energy materials take the form of respective filaments forming components of a mesh fabric, said junctions occurring at contact points between said filaments.

3. A method according to claim 2, in which said mesh fabric is a knitted fabric.

4. A method according to claim 2, in which said mesh fabric is a woven fabric.

5. A method according to claim 2, in which said high and low surface energy materials take the form of respective filaments of a two-ply member and in which said mesh fabric is formed from said two-ply member.

6. A method according to claim 2, in which said mesh fabric is a knitted fabric comprising a plurality of stitches providing at least four said surface junctions per stitch.

7. A method according to claim 2, in which said first element comprises a stainless steel filament and said second element comprises a polypropylene filament.

8. A method according to claim 1, in which said perforate packing comprises a plurality of layers of a knitted mesh fabric knitted from a double strand comprising a polypropylene filament and a stainless steel wire, said knitted mesh fabric comprising a plurality of loops of said double strand, each said loop interlocking with one or more adjacent loops, and said surface junctions occurring at contact points between said polypropylene filament and said stainless steel wire within and between said loops.

9. A method according to claim 1, in which said low surface energy material is selected from the group consisting of polypropylene, nylon, polytetrafluoroethylene and polyethylene.

10. A method according to claim 9, in which said high surface energy material is stainless steel and in which said low surface energy material is polypropylene.

* * * * *